US006550230B2

(12) United States Patent
Fox

(10) Patent No.: US 6,550,230 B2
(45) Date of Patent: Apr. 22, 2003

(54) HARVESTER UNIT FOR NARROWLY SPACED PLANTS WITH TRANSVERSE FEEDING OF OFFSET PLANTS

(75) Inventor: Jeffrey Robert Fox, Minburn, IA (US)

(73) Assignee: Deere & Company, Moline, IL (US)

( * ) Notice: Subject to any disclaimer, the term of this patent is extended or adjusted under 35 U.S.C. 154(b) by 35 days.

(21) Appl. No.: 09/863,926

(22) Filed: May 23, 2001

(65) Prior Publication Data

US 2002/0174640 A1 Nov. 28, 2002

(51) Int. Cl.⁷ .............................................. A01D 46/16
(52) U.S. Cl. ................................................ 56/44; 56/41
(58) Field of Search ............................... 56/44, 41, 33, 56/34, 37, 39, 127, 330, 43, 47, 50, 48

(56) References Cited

U.S. PATENT DOCUMENTS

| | | | |
|---|---|---|---|
| 2,986,861 A | 6/1961 | Hubbard | 56/41 |
| 3,031,828 A | 5/1962 | Graham | 56/14 |
| 3,035,387 A | 5/1962 | Bevill | 56/28 |
| 3,088,262 A | 5/1963 | Graham | 56/41 |
| 3,176,451 A | 4/1965 | Hubbard | 56/14 |
| 3,352,092 A | 11/1967 | Hubbard | 56/12 |
| 3,638,406 A | * 2/1972 | Scherer et al. | 56/14.9 |
| 3,645,075 A | 2/1972 | Kappelman et al. | 56/28 |
| 3,685,263 A | 8/1972 | Kappelman et al. | 56/1 |
| 4,249,365 A | 2/1981 | Hubbard et al. | 56/13.2 |
| 4,269,017 A | 5/1981 | deBuhr et al. | 56/106 |
| 4,470,245 A | 9/1984 | Agadi | 56/28 |
| 4,501,112 A | 2/1985 | Thedford et al. | 56/13.3 |
| 4,538,403 A | 9/1985 | Fachini | 56/44 |
| 4,581,878 A | * 4/1986 | Vida et al. | 56/114 |
| 4,821,497 A | 4/1989 | Deutsch et al. | 56/41 |
| 5,247,786 A | 9/1993 | Schreiner | 56/41 |
| 5,412,930 A | 5/1995 | Sheldon, Jr. | 56/44 |
| 5,471,826 A | 12/1995 | Schreiner | 56/41 |
| 5,519,988 A | 5/1996 | Copley et al. | 56/30 |
| 5,557,910 A | 9/1996 | Del Rosario | 56/30 |
| 6,212,864 B1 | 4/2001 | Harden et al. | 56/36 |
| 6,293,078 B1 | * 9/2001 | Deutsch et al. | 56/44 |

* cited by examiner

Primary Examiner—Robert E. Pezzuto
Assistant Examiner—Árpád F Kovács

(57) ABSTRACT

A tandem spindle drum row unit arrangement includes a rotary knife offset ahead of the forward drum to sever plants. A feeder rotor with fingers projecting through grid bar structure gently directs plants laterally into a standing row prior to substantial engagement by the spindles on the forward drum. Feeder column rotational speed is synchronized with ground speed. The knife, having a common axis with the rotor, operates at a higher speed for an efficient cut. The feeder column includes curved fingers which project through vertically spaced bars on a guard assembly to positively separate the plant from the fingers. The feeder column and rotary knife are driven through separate slip clutches. A kicker wheel between the drums moves plant material rearwardly.

25 Claims, 4 Drawing Sheets

HARVESTER UNIT FOR NARROWLY SPACED PLANTS WITH TRANSVERSE FEEDING OF OFFSET PLANTS

FIELD OF THE INVENTION

The present invention relates generally to agricultural harvesters and, more specifically, to a harvester for removing crop from adjacent, closely spaced rows of plants.

BACKGROUND OF THE INVENTION

Harvesters such as cotton pickers include row units having upright picker drums with spindles projecting into a row receiving area to remove cotton from a row of plants. Harvesting very narrowly spaced rows of cotton has been a continuing source of difficulty. Cotton picker units such as shown in commonly assigned U.S. Pat. No. 4,821,497 with picker drums supported in tandem on one side only of the row or nested row harvesting units as shown in U.S. Pat. No. 4,538,403 have provided row harvesting capability for some narrow row spacings, but the reduction has not been sufficient to accommodate very narrowly spaced rows of fifteen inches or less. In some areas the rows may be spaced as closely as twelve inches (30 cm), and harvesting with conventional row units can result in substantial adjacent row plant damage and cotton loss. Cotton strippers with comb style heads often are used for removing cotton from narrowly spaced plants, but such heads are relatively inefficient and fail to effectively separate cotton and trash.

In commonly assigned U.S. Pat. No. 6,212,864 filed May 28, 1999 and entitled NARROW ROW COTTON HARVESTER, a crop severing and conveying attachment is described for cutting a row of plants and moving the plants into an adjacent standing row prior to contact by a forward spindle drum. The cut plants intertwine with the standing row so the picking drums can remove cotton from both rows of plants. Although the attachment is capable of harvesting rows spaced apart fifteen inches or less, the cutter as shown therein is offset forwardly from the drums a considerable distance. The plants must be supported well to keep them upright as they move diagonally rearwardly into the adjacent standing row, and the system requires a relatively long belt conveyer and cutter drive system. The front of the attachment extends forwardly beyond the row unit thereby substantially increasing the operating length of the harvester.

In commonly assigned and copending U.S. application Ser. No. 09/436,330 filed Nov. 8, 1999 and entitled NARROW ROW HARVESTER, now U.S. Pat. No. 6,293,078, another narrow row system is described wherein the spindles of a forward drum provide both a lateral transporting function for a severed row of cotton and a cotton removal function for the severed row and an adjacent standing row of cotton. The lateral speed of the spindles is relatively high at point of contact with the severed plant. Therefore, the spindle transport function is aggressive and increases drum loading and wear. The high lateral speed of the spindles in the transport area also results in cotton plant disorientation and cotton loss. A rotating column, which is located ahead of the drum to assist in lateral movement of the severed plants, frequently wraps with plant material which is carried around with the column. A plant cutter which rotates at the same speed as the column to sever the cotton plants rotates too slowly for optimum cutting when the column is rotating at the desired plant transporting speed.

BRIEF SUMMARY OF THE INVENTION

It is therefore an object of the present invention to provide an improved harvester row unit for harvesting crops planted in narrowly spaced rows. It is a further object to provide such a unit which overcomes most or all of the aforementioned problems.

It is a further object to provide such an improved harvester row unit for harvesting narrowly spaced rows of plants which severs plants offset from the row receiving area and moves the severed plants laterally into the row receiving area for contact with the spindles of a picker drum. It is another object to provide such a unit having reduced drum loading and wear compared to units wherein the spindles of the drum provide a substantial portion of the severed plant transverse conveying function.

It is another object of the present invention to provide an improved cotton picker row unit for simultaneously harvesting two narrowly spaced rows of cotton. It is a further object to provide such a row unit having a picking spindle drum for harvesting cotton from the two rows wherein the drum has at most only a minimal lateral transport function. It is yet another object to provide such row unit having improved cutting and lateral conveying characteristic and reduced drum loading and spindle wear.

It is still a further object to provide a cotton harvester row unit for harvesting narrowly spaced plants, and wherein the unit has an improved plant severing and transport system. It is another object to provide such a system having an improved drive arrangement which optimizes cutting efficiency and transport of severed plants into alignment with the spindle engagement area or crop removal zone of the unit.

It is another object to provide an improved harvester row unit capable of efficiently harvesting narrowly spaced cotton plants. It is a further object to provide such a unit particularly useful for harvesting rows of cotton plants spaced twelve to eighteen inches (30–45 cm.) apart. It is another object to provide such a unit for accommodating two adjacent rows of cotton wherein one of the rows is severed and moved laterally by feeder structure driven from the row unit drive structure. It is a further object to provide such a unit wherein the feed structure is synchronized with ground speed while the severing device is rotated at a higher speed.

A narrow row harvesting unit is described which is particularly useful for harvesting cotton plants in narrowly spaced rows. The crop removing portion of the unit includes a tandem spindle drum arrangement defining a main crop removing zone aligned with a standing row of cotton plants. A rotary knife offset ahead of the forward drum severs plants adjacent the row, and a feeder rotor or column with plant engaging projections rotates on a common axis with the rotary knife to gently direct the severed plants laterally between grid structure toward the crop removing zone and into the standing row prior to substantial engagement by the spindles on the forward drum. The rotary knife and feeder column are driven on the common axis from the row unit drive so the feeder column speed is synchronized with ground speed. The knife operates at a higher speed than the feeder to efficiently sever the plants and provide a clean cut. The feeder column includes fingers having a curved profile and projecting through vertically spaced bars of the grid structure to provide positive separation of the plant from the fingers. Plant carry-around by the feeder column is eliminated. Horizontal ribs located opposite the feeder column help keep the plants in contact with the fingers. The feeder column and rotary knife each are driven through a separate slip clutch for better protection. Kicker wheel structure located between the tandem drums moves plant material rearwardly in the zone. In one embodiment, the kicker wheel structure is located between the drums on the same side of the row as the drums to provide a compact package and facilitate kicker wheel drive.

These and other objects, features and advantages of the present invention will become apparent to one skilled in the art upon reading the following detailed description in view of the drawings.

DESCRIPTION OF THE PREFERRED EMBODIMENT

Figure 1:
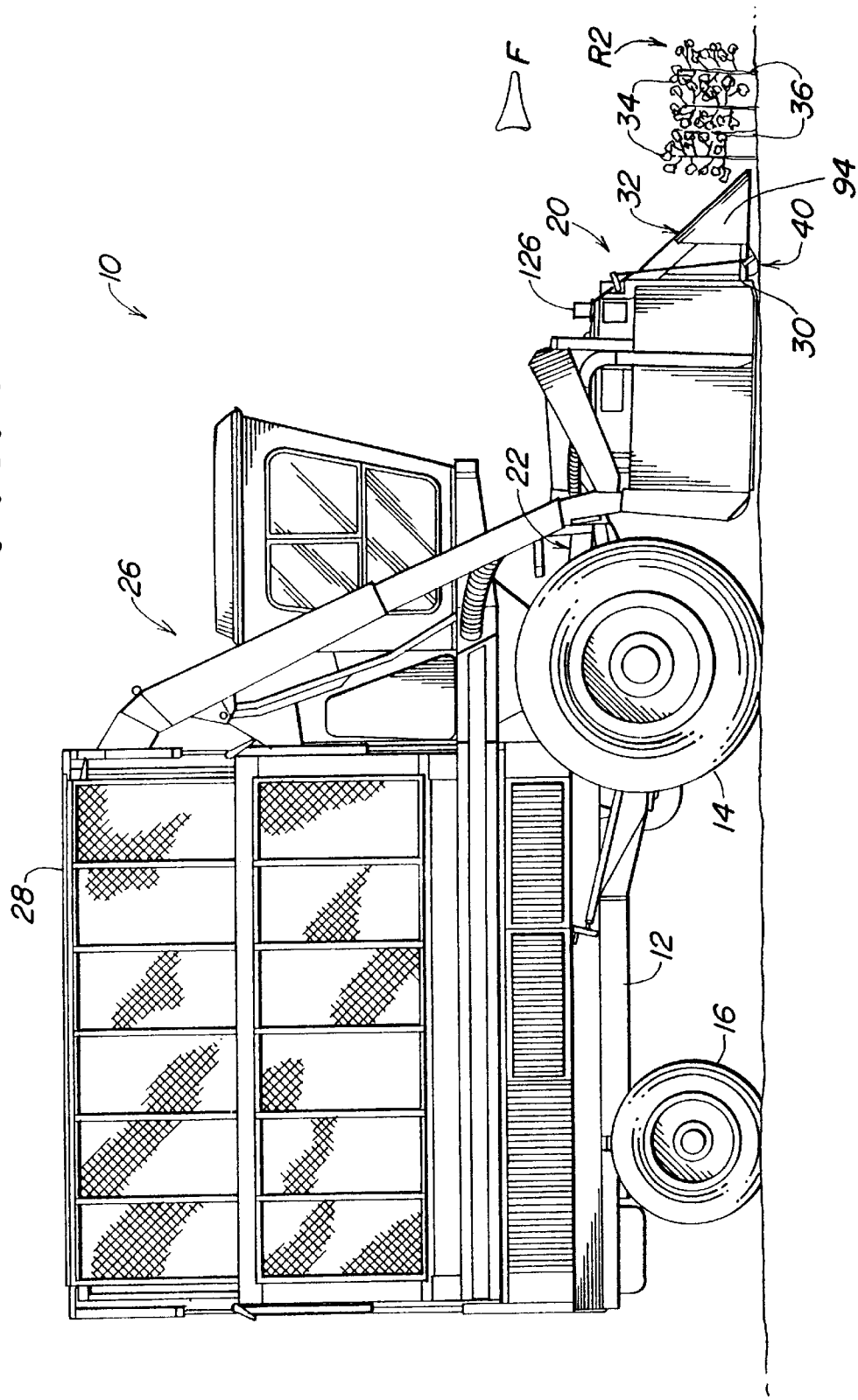
FIG. 1 is a side view of a cotton harvester having row units for harvesting closely spaced rows of cotton plants.

Referring now to FIG. 1, therein is shown a cotton harvester 10 including a main frame 12 supported for forward movement over a field of plants to be harvested by forward drive wheels 14 and rear steerable wheels 16. Transversely spaced multiple row harvesting units 20 are supported from the forward end of the frame 12 by one or more conventional hydraulically controlled lift structures 22. The row units remove cotton from rows of the plants, and an air duct system 26 directs the removed cotton rearwardly and upwardly into a basket 28. Although the row units 20 are shown mounted on a self-propelled harvester, it is to be understood that they can also be attached to a tractor in a conventional tractor mounted configuration.

The row unit 20 includes a forward frame assembly 30 supporting stalk lifter structure 32 which helps to guide closely spaced, adjacent rows of plants (R1 and R2) into the unit. A height sensing shoe assembly 40 is supported from the frame assembly 30 and controls the lift control structure 22 to maintain the unit 20 at a generally constant height above the ground during field operations as ground and surface conditions vary.

Figure 2:
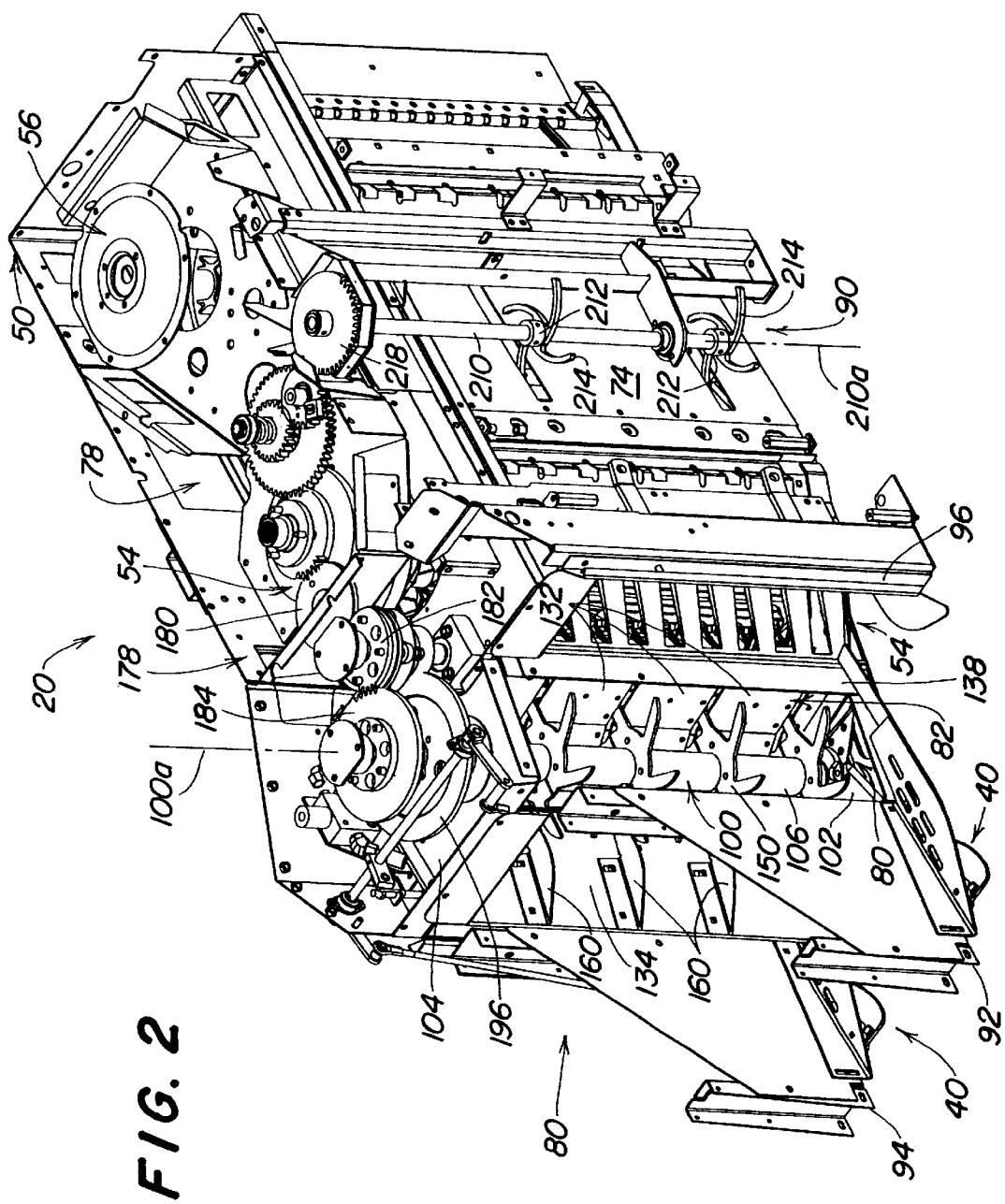
FIG. 2 is an enlarged top front perspective view of one of the row units on the harvester of FIG. 1 with portions removed to better show the severing, feeding and cotton removing structure and the drive structure of the unit.
Figure 3:
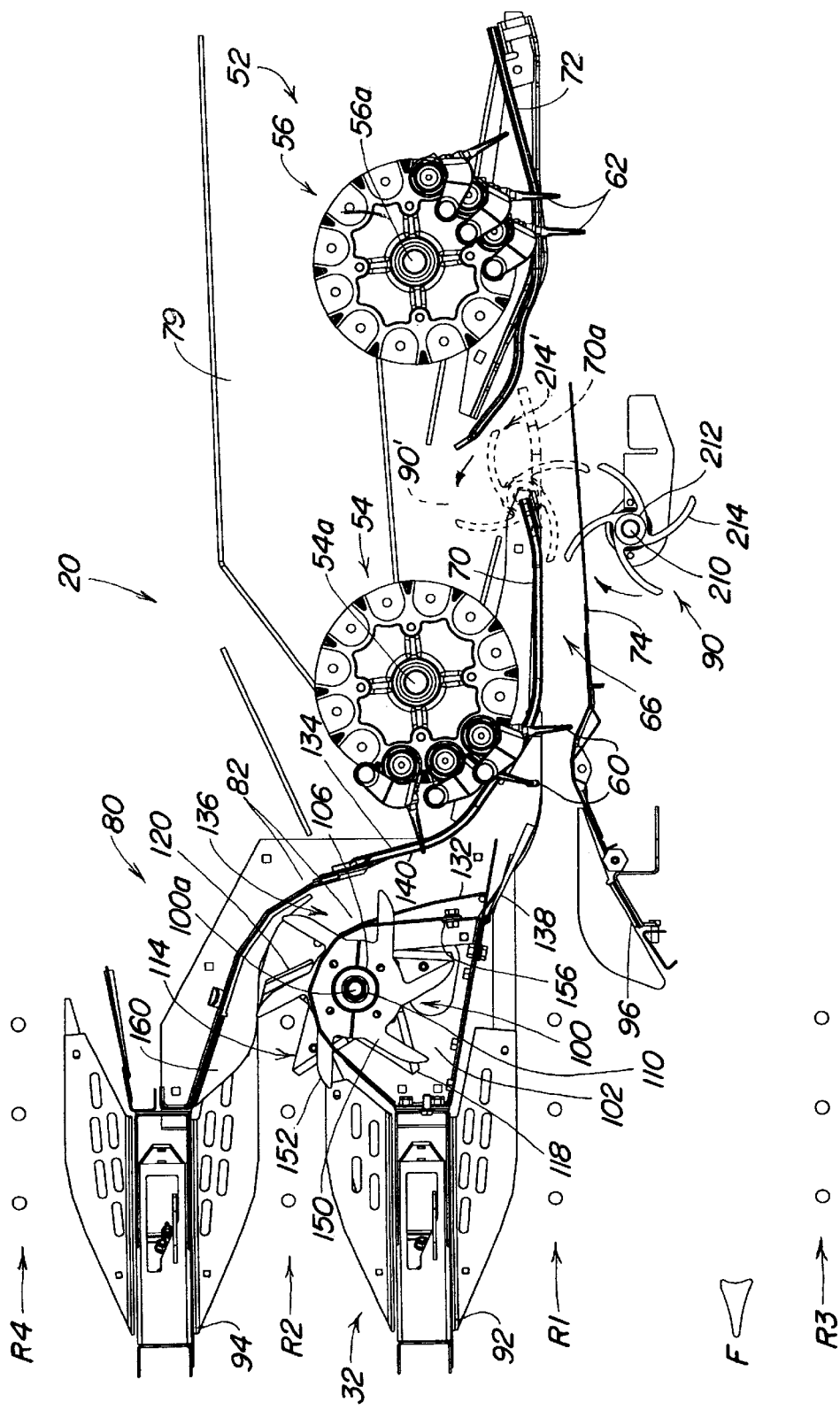
FIG. 3 is an enlarged top view of the row unit of FIG. 2 with parts removed to better show the feed paths of adjacent narrowly spaced cotton plants.

The row unit 20 includes a framed row unit housing 50 supporting a tandem drum arrangement 52 (FIG. 3) generally of the type shown and described in the aforementioned U.S. Pat. No. 4,821,497. The arrangement 52 includes forward and rearward spindle drums 54 and 56 supported for rotation (in the counter clockwise direction as shown in FIGS. 2 & 3) about upright axes 54a and 56a which are generally aligned in the fore and aft direction. Drive structure 78 rotates the spindle drums 54 and 56 at a speed synchronized with the forward speed of the harvester 10. Spindles 60 and 62 which are rotated about their axes project into a cotton removal or harvest zone 66 through grid bars 70 and 72 to remove cotton from the cotton plants passing rearwardly through the zone 66 between the bars and a pressure plate 74. The synchronized drive assures the spindles have approximately a zero velocity relative to the plants moving rearwardly through the zone 66. The cotton is then doffed from the spindles by conventional upright doffer columns (not shown) and moved rearwardly through a door structure 79 for delivery to the basket 28 by the air system 26.

As best seen in FIG. 3, the harvest zone 66 is aligned with a row-receiving area for receiving a row R1 of cotton plants. As shown, second and third rows of plants R2 and R3 are each spaced from the first row R1 on the order of twelve inches (30 cm). As can be appreciated from FIG. 3, the row spacing is insufficient to accommodate additional harvesting drums for one of the additional rows without interfering with an adjacent row. To facilitate harvesting of an additional row (R2 as shown in FIG. 3), cutting and feeding structure 80 and spaced guide or grid structure 82 are provided forwardly of the leading drum 54 to sever the row of plants R2 and gently guide the severed plants into the standing row R1. The grid structure 82 prevents substantial contact of the severed plants by the spindles 60 until the plants closely approach a position aligned with the harvest zone 66. The grid structure 82 also prevents plant wrapping in the structure 80. As the standing row R1 intermingled with the cut plants from the row R2 pass rearwardly through the zone 66, the rotating spindles 60 and 62 project into the plants and remove the cotton from the plants. Kicker wheel structure 90 partially projecting through the pressure plate 74 helps move plant material rearwardly through the zone 66.

The stalk lifter structure 32 of the row unit 20 includes a central lifter assembly 92 which is adapted to run between the rows R1 and R2 and which is generally centered with respect to the drum axes 54a and 56a. A similar lifter assembly 94 is located outwardly of the row R1 and inwardly adjacent the next outermost row R4. The assemblies 92 and 94 are offset forwardly of the drum 54 to accommodate the cutting and feeding structure 80 and the grid structure 82. Upright plant guide structure 96 angles outwardly in the forward direction F from a location on the opposite side of the row unit 20 adjacent the forward drum 54 to facilitate guidance of the row R1 into the harvest zone 66.

The cutting and feeding structure 80 includes an upright feeder 100 supported for rotation about an upright axis 100a between a floor panel 102 and a top panel 104. The feeder 100 includes a hollow support shaft 106 connected to the drive structure 78 for rotation about the axis 100a at a speed synchronized with the forward speed of the harvester 10. A cutter drive shaft 110 is supported for rotation about the axis 100a within the hollow support shaft 106 and extends through the floor panel 102 to a connection with a star-shaped cutter 114 (FIG. 3). The drive shaft 110 is also connected to the drive structure 78 for rotating the cutter 114 about the axis 100a at a speed substantially greater than the speed of the feeding structure 80. The cutter 114 includes reversible cutting blades 118 with beveled leading edges which rotate (clockwise as shown in FIGS. 2 and 3) adjacent an angled shear plate 120 to sever the plants above the ground at a location centered between and adjacent the rear of the stalk lifter assemblies 92 and 94.

The guide or grid structure 82 includes first and second spaced upright guides or grids 132 and 134 defining a plant path 136 which extends rearwardly and laterally inwardly toward the harvest zone 66. The first grid 132 extends outwardly from the lifter assembly 92 and curves rearwardly and inwardly around the axis 100a to a termination with upright plant guide structure 138 adjacent the zone 66. The second grid 134 extends rearwardly and inwardly from the lifter assembly 94 to a central location 140 where the spindles 60 begin to project through the grid. The location 140 is offset beyond the location wherein the spindles 60 have high acceleration rates to reduce spindle loading and prevent overly aggressive lateral plant transport by the drum 54. The second grid curves inwardly and rearwardly from the location 140 to the forward extremity of the forward drum grid bars 70 where the spindles 60 fully project into the standing row R1 and into the plants from the cut row R2 conveyed into the standing row.

The upright feeder 100 includes a plurality of vertically spaced feeder wheels 150 having rearwardly curved tines 152 projecting through the first grid 132 into the plant path 136 from a location forwardly of the shear plate 120 to a location 156 offset forwardly and slightly outwardly of the harvest zone 66. As shown, four wheels 150, each having six uniformly spaced tines 152, are mounted for rotation with the support shaft 106 about the axis 100a. The first grid 132 includes panels (FIG. 2) vertically spaced to define slots for receiving the tines therethrough. Opposite each of the wheels 150 is a horizontal rib 160 located slightly below the wheel and on the opposite side of the path. The outermost ends of the tines slightly overlap the innermost edges of the ribs 160 to assure positive engagement of the tines 152 with the plants in the row R2 as the plants are severed and moved rearwardly and inwardly. The ribs 160 narrow in the downstream direction and terminate at a location generally aligned with the outside of the drums 54 and 56 (FIG. 3).

The drive structure 78 for the drums 54 and 56 is of conventional construction and provides drum speed generally matched to the forward speed of the harvester 10. However, additional drive to the cutting and feeding structure 80 is provided through assembly drive 178 (FIGS. 2 and 4) which includes an idler gear 180 driven from the front drum portion of the drive structure 78. The idler gear 180 drives a first gear 182 (FIG. 4) which in turn meshes with and drives a second gear 184. A first slip clutch assembly 190 is driven by the gear 182 and includes a drive gear 192 meshing with a driven gear 196 connected to the feeder wheel support shaft 106 for rotation of the feeder 100 at a speed synchronized with the forward speed of the harvester 10. The second gear 184 is connected through a second slip clutch assembly 200 to the cutter drive shaft 110 for rotation of the cutter 114 at a speed substantially greater than the speed of the feeder 100. Preferably, the RPM of the cutter 114 is approximately twice that of the feeder 100. As shown, with the harvester 10 operating at a typical forward speed, the feeder 100 will operate at approximately 200 RPM while the cutter 114 rotates at approximately 420 RPM. The central portions of the tines 152 are aligned with the centerline of the row R2 and have a speed which is slightly greater than forward speed to keep the throat area of the feeder 100 slightly ahead of the incoming plants. The tip speed of the tines 152 is approximately 1.7 times the forward speed in the embodiment shown.

The kicker wheel structure 90 (FIGS. 2 and 3) includes a drive shaft 210 supported from the row unit housing 50 for rotation about an upright axis 210a. A pair of vertically spaced kicker wheels 212 are connected to the shaft 210 for rotation about the axis 210a, and each includes four rearwardly bent tines 214 which project through slots in the pressure plate 74 between the drums 54 and 56. A gear 218 fixed to the upper end of the shaft 210 is driven from the drive structure 78 at a speed synchronized with the forward speed of the harvester 10. The gear ratios are selected such that the radially outermost portion of the tines 214 travel at a speed substantially greater than the harvester speed. The centers of the tines 214 generally align with the centerline of the row R1 when fully projecting through the plate 74, and the speed at the central portion of the tine more closely approximates the forward speed of the harvester. However, the speed at the tine center is still slightly greater than ground speed to help move plant material rearwardly through the zone 66. By way of example, it has been found that driving the wheels 212 at approximately 240 RPM so that the central portion of the tine moves rearwardly at a speed of approximately 1.1 times forward speed of the harvester 10 provides good helper action to keep the zone 66 clear.

Figure 4:
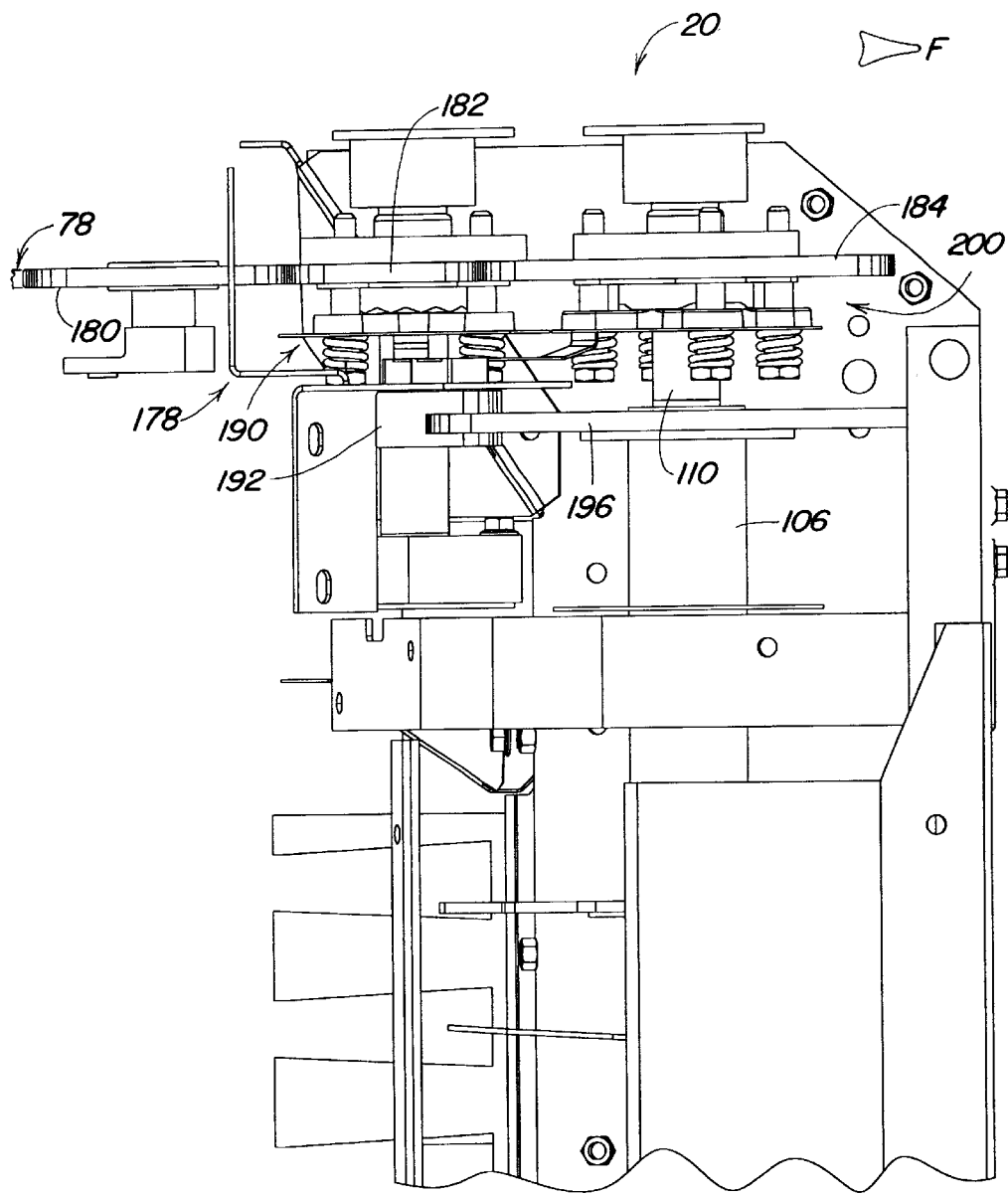
FIG. 4 is an enlarged side view of a portion of the rotary knife and feeder column drives with portions removed to better show the individual slip clutches for the drives.

As shown in the solid lines of FIG. 4, the kicker wheel axis 210 is located on the side of the row R1 opposite the drums 54 and 56. In an alternate embodiment (broken lines of FIG. 3), a more compact arrangement is provided by placing the kicker wheel 90' on the drum side of the row R1 and extending the grid bars 70 rearwardly towards the grid bars 72. The rearwardly bent tines 214' project through extensions 70a of the forward grid bars 70 into the zone 66.

Having described the preferred embodiment, it will become apparent that various modifications can be made without departing from the scope of the invention as defined in the accompanying claims.

What is claimed is:

1. A harvester adapted for forward movement over a field for harvesting at least first and second rows of plants transversely spaced a preselected distance or less apart including a row unit having a width approximately equal to or greater than the preselected distance, the row unit including first and second row receiving areas, an upright harvester drum supported for rotation at a drum speed adjacent the first row receiving area for removing crop from first row of plants, an upright feeder rotatable about an upright axis adjacent the second row receiving area and forwardly of the harvester drum, drive structure rotating the upright feeder at a speed corresponding to the drum speed to gently direct the second row of plants transversely towards the first row of plants, and a cutter supported adjacent the lower end of the upright feeder and connected to the drive structure for rotation at a speed greater than the speed of the feeder for severing the second row of cotton plants.

2. The harvester as set forth in claim 1 wherein the cutter is mounted for rotation about the upright axis and is connected to the drive structure for rotation at a speed substantially greater than the speed of the upright feeder.

3. The harvester as set forth in claim 2 wherein the drive structure includes a first slip clutch connecting drive to the upright feeder and a second slip clutch connecting drive to the cutter so that the feeder and cutter have separate drive protection.

4. The harvester as set forth in claim 1 wherein the upright feeder comprises vertically spaced finger wheels having fingers curved rearwardly relative to direction of rotation of the feeder.

5. The harvester as set forth in claim 1 including feeder grid structure supported adjacent the upright feeder, wherein the upright feeder comprises fingers projecting through the feeder grid structure adjacent the second row receiving area.

6. The harvester as set forth in claim 5 wherein the harvesting drum includes projecting spindles and further including a spindle grid offset from the feeder grid structure, the spindle grid and feeder grid structure defining a laterally extending plant path for the second row of plants.

7. The harvester as set forth in claim 6 wherein the spindle grid limits contact of the spindles with the second row of plants until the second row is moved laterally towards alignment with the first row of plants.

8. The harvester as set forth in claim 5 further including rib structure located on a side of the second row opposite a feeder side of the row to assist in maintaining plants in the second row in contact with the feeder.

9. A harvester adapted for forward movement over a field for harvesting at least first and second rows of plants transversely spaced a preselected distance or less apart including a row unit having a width approximately equal to or greater than the preselected distance, the row unit including first and second row receiving areas, an upright harvester drum supported for rotation at a drum speed adjacent the first row receiving area for removing crop from first row of plants, an upright feeder rotatable about an upright axis adjacent the second row receiving area and forwardly of the harvester drum, drive structure rotating the upright feeder to gently direct the second row of plants transversely towards the first row of plants, a cutter supported adjacent the lower end of the upright feeder for cutting the second row of plants, and including grid structure guiding the second row towards the first row and maintaining the second row out of contact with the harvester drum until the second row is generally aligned with the first row receiving area.

10. A harvester adapted for forward movement over a field for harvesting at least first and second rows of plants transversely spaced a preselected distance or less apart including a row unit having a width approximately equal to or greater than the preselected distance, the row unit including first and second row receiving areas, an upright harvester drum rotatably supported adjacent the first row receiving area for removing crop from first row of plants, an upright feeder rotatable about an upright axis adjacent the second row receiving area and forwardly of the harvester drum, a driveable cutter for severing the second row of plants, drive structure rotating the upright feeder and driving the cutter to sever and direct the second row of plants transversely towards the first row of plants, and grid structure defining a transversely extending path for the second row of plants, the grid structure including a drum grid separating the harvesting drum from the second row of plants until the second row is moved laterally into the first row of plants and a feeder grid providing contact of the feeder with the second row of plants as the second row is moved laterally towards the first row.

11. The harvester as set forth in claim 10 wherein the cutter is mounted for rotation about the upright axis and connected to the drive structure for rotation at a speed greater than the speed of the upright feeder.

12. The harvester as set forth in claim 10 wherein the harvesting drum comprises spindles projecting into the first row of plants, wherein the grid structure maintains the second row out of contact with the spindles until the second row is generally aligned with the first row receiving area.

13. The harvester as set forth in claim 10 wherein the upright feeder comprises vertically spaced finger wheels having fingers curved rearwardly relative to direction of rotation of the feeder.

14. The harvester as set forth in claim 10 wherein the upright feeder comprises fingers projecting through the grid structure adjacent the second row receiving area and receding behind the grid structure as the fingers approach the first row receiving area to prevent wrap around of plant material.

15. The harvester as set forth in claim 14 wherein the grid structure includes a spindle grid and a feeder grid spaced from the spindle grid to define the transversely extending path.

16. The harvester as set forth in claim 15 wherein the spindle grid limits contact of the harvester drum with the second row of plants until the second row is moved laterally towards alignment with the first row of plants.

17. The harvester as set forth in claim 10 wherein the drive structure synchronizes the speed of the upright feeder with speed of rotation of the harvester drum.

18. The harvester as set forth in claim 14 including a rear grid located rearwardly of the harvester drum, and a rotating member with fingers extending through the rearwardly extending grid and moving plant material rearwardly from the first row receiving area.

19. The harvester as set forth in claim 10 wherein the upright feeder includes feeder fingers for projecting into one side of the second row of plants, and further comprising rib structure offset radially from the axis on the opposite side of the second row of plants and cooperating with the feeder fingers to maintain the second row of plants engaged with the feeder fingers.

20. A harvester adapted for forward movement over a field for harvesting at least first and second rows of plants transversely spaced a preselected distance or less apart including a row unit having a width approximately equal to or greater than the preselected distance, the row unit including first and second row receiving areas, an upright harvester drum supported adjacent the first row receiving area for removing crop from first row of plants, an upright feeder rotatable about an upright axis adjacent the second row receiving area and forwardly of the harvester drum, a driveable cutter for severing the second row of plants, drive structure rotating the upright feeder and driving the cutter to sever and direct the second row of plants transversely towards the first row of plants, grid structure defining a transversely extending path for the second row of plants, the grid structure including a drum grid separating the harvesting drum from the second row of plants until the second row is moved laterally into the first row of plants and a feeder grid providing contact of the feeder with the second row of plants as the second row is moved laterally towards the first row, and wherein the drive structure includes a first slip clutch connecting drive to the upright feeder and a second slip clutch connecting drive to the cutter so that the feeder and cutter have separate drive protection.

21. A harvester adapted for forward movement over a field for harvesting first and second sets of cotton plants transversely spaced a preselected distance or less apart, the harvester having a row unit including first and second plant receiving areas for receiving the respective first and second sets, an upright spindle drum structure supported for rotation adjacent the first plant receiving area and including spindles projecting into the first set of cotton plants for removing cotton from the first set, first and second spaced guides defining a transversely extending path between the first and second plant receiving areas and forwardly of the spindle drum structure, a feeder rotatable about an upright axis forwardly adjacent the first guide and including projection portions extending through the first guide into the path, a driveable cutter for severing the second set of plants, drive structure rotating the upright feeder and driving the cutter to sever and direct the second set of plants transversely towards the first set of plants, and wherein the spindles extend through the second guide into the path at a location adjacent the first plant receiving area so that transverse movement of the second set of plants is primarily effected by the upright feeder and occurs prior to the severed second set of plants being substantially contacted by the spindles.

22. The harvester as set forth in claim 21 wherein the upright spindle drum structure includes first and second upright spindle drums spaced on one side only of the first set of plants, and kicker structure rotatable about an upright axis between the first and second drums, and drive structure connected to the spindle drums and to the kicker structure for rotating the kicker structure at a speed proportional to drum speed and moving plant material rearwardly of the first plant receiving area.

23. The harvester as set forth in claim 21 wherein the second guide includes ribs extending towards the feeder and facilitating engagement of the projection portions with the second set of plants.

24. A harvester adapted for forward movement over a field for harvesting first and second sets of cotton plants transversely spaced a preselected distance or less apart, the harvester having a row unit including first and second plant receiving areas for receiving the respective first and second sets, an upright spindle drum structure supported adjacent the first plant receiving area and including spindles projecting into the first set of cotton plants for removing cotton from the first set, first and second spaced guides defining a transversely extending path between the first and second plant receiving areas and forwardly of the spindle drum structure, a feeder rotatable about an upright axis forwardly adjacent the first guide and including projection portions extending through the first guide into the path, a driveable cutter for severing the second set of plants, drive structure rotating the upright feeder and driving the cutter to sever and direct the second set of plants transversely towards the first set of plants, and wherein the spindles extend through the second guide into the path at a location adjacent the first plant receiving area so that transverse movement of the second set of plants is primarily effected by the upright feeder and occurs prior to the severed second set of plants being substantially contacted by the spindles, and kicker structure rotatable about an upright axis, wherein the upright axis of the kicker structure is located on one side only of the first set of plants.

25. A harvester adapted for forward movement over a field for harvesting first and second sets of cotton plants transversely spaced a preselected distance or less apart, the harvester having a row unit including first and second plant receiving areas for receiving the respective first and second sets, an upright spindle drum structure supported adjacent the first plant receiving area and including spindles projecting into the first set of cotton plants for removing cotton from the first set, first and second spaced guides defining a transversely extending path between the first and second plant receiving areas and forwardly of the spindle drum structure, a feeder rotatable about an upright axis forwardly adjacent the first guide and including projection portions extending through the first guide into the path, a driveable cutter for severing the second set of plants, drive structure rotating the upright feeder and driving the cutter to sever and direct the second set of plants transversely towards the first set of plants, and wherein the spindles extend through the second guide into the path at a location adjacent the first plant receiving area so that transverse movement of the second set of plants is primarily effected by the upright feeder and occurs prior to the severed second set of plants being substantially contacted by the spindles, and wherein the cutter rotates about the upright axis, and wherein the drive structure rotates the cutter at a speed greater than the speed of the upright feeder.

* * * * *